US011427725B2

(12) United States Patent
Stasiak et al.

(10) Patent No.: US 11,427,725 B2
(45) Date of Patent: Aug. 30, 2022

(54) PHOTOLUMINESCENT MATERIAL SETS

(71) Applicant: Hewlett-Packard Development Company, L.P., Houston, TX (US)

(72) Inventors: James William Stasiak, Corvallis, OR (US); Garry Hinch, Corvallis, OR (US); Sterling Chaffins, Corvallis, OR (US); Kevin P. DeKam, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1032 days.

(21) Appl. No.: 16/074,235

(22) PCT Filed: Apr. 28, 2016

(86) PCT No.: PCT/US2016/029838
§ 371 (c)(1),
(2) Date: Jul. 31, 2018

(87) PCT Pub. No.: WO2017/188961
PCT Pub. Date: Nov. 2, 2017

(65) Prior Publication Data
US 2021/0179878 A1 Jun. 17, 2021

(51) Int. Cl.
| | |
|---|---|
| *C09D 11/50* | (2014.01) |
| *B33Y 30/00* | (2015.01) |
| *B33Y 70/00* | (2020.01) |
| *B29C 64/112* | (2017.01) |
| *B33Y 80/00* | (2015.01) |
| *B29C 64/165* | (2017.01) |
| *C09D 11/037* | (2014.01) |
| *C09D 11/102* | (2014.01) |
| *C09D 11/322* | (2014.01) |
| *C09D 11/54* | (2014.01) |
| *B82Y 20/00* | (2011.01) |
| *B82Y 40/00* | (2011.01) |

(52) U.S. Cl.
CPC ............ *C09D 11/50* (2013.01); *B29C 64/112* (2017.08); *B29C 64/165* (2017.08); *B33Y 30/00* (2014.12); *B33Y 70/00* (2014.12); *B33Y 80/00* (2014.12); *C09D 11/037* (2013.01); *C09D 11/102* (2013.01); *C09D 11/322* (2013.01); *C09D 11/54* (2013.01); *B29K 2995/0018* (2013.01); *B82Y 20/00* (2013.01); *B82Y 40/00* (2013.01)

(58) Field of Classification Search
CPC ..... C09D 11/50; C09D 11/037; C09D 11/102; C09D 11/322; C09D 11/54; C09D 11/328; C09D 11/324; B29C 64/112; B29C 64/165; B33Y 30/00; B33Y 70/00; B33Y 80/00; B29K 2995/0018; B82Y 40/00; B82Y 20/00; C09K 11/06; C09K 11/02; C09K 11/00
See application file for complete search history.

(56) References Cited

U.S. PATENT DOCUMENTS

| | | |
|---|---|---|
| 5,351,151 A | 9/1994 | Levy |
| 5,993,854 A | 11/1999 | Needleman et al. |
| 6,363,606 B1 | 4/2002 | Johnson et al. |
| 6,589,471 B1 | 7/2003 | Khoshnevis |
| 6,599,444 B2 | 7/2003 | Burnell-Jones |
| 7,365,129 B2 | 4/2008 | Kramer et al. |
| 7,919,018 B2 | 4/2011 | Williams et al. |
| 7,972,426 B2 | 7/2011 | Hinch et al. |
| 8,623,951 B2 | 1/2014 | Kambe |
| 9,281,186 B2 | 3/2016 | Wooton |
| 9,313,360 B2 | 4/2016 | Morovic et al. |
| 10,375,765 B2 | 8/2019 | Chaffins et al. |
| 2004/0126567 A1 | 7/2004 | Dimond et al. |
| 2004/0137228 A1 | 7/2004 | Monsheimer et al. |
| 2005/0003189 A1 | 1/2005 | Bredt et al. |
| 2005/0042453 A1 | 2/2005 | James et al. |
| 2005/0072113 A1 | 4/2005 | Collins et al. |
| 2005/0105191 A1 | 5/2005 | Baer et al. |
| 2005/0057245 A1 | 6/2005 | Baer et al. |
| 2006/0046093 A1 | 3/2006 | Landry et al. |
| 2006/0290032 A1 | 12/2006 | Sano |
| 2007/0183918 A1 | 8/2007 | Monsheimer et al. |
| 2007/0238056 A1 | 10/2007 | Baumann et al. |
| 2007/0241482 A1 | 10/2007 | Giller et al. |
| 2008/0122141 A1 | 5/2008 | Bedal et al. |

(Continued)

FOREIGN PATENT DOCUMENTS

| | | |
|---|---|---|
| CN | 1950192 | 4/2007 |
| CN | 101019059 | 8/2007 |

(Continued)

OTHER PUBLICATIONS

Zhou. The broad emission at 785 nm in YAG:Ce 3+ ,Cr 3+ phosphor. Sep. 2017 Spectrochimica Acta Part A Molecular and Biomolecular Spectroscopy 190 (Year: 2017).
PRIMIR, "Emerging Printing Technologies & Applications", Pivotal Resources, 2014, 2 pages.
Casey Check et al.—Inkjet printing of 3D nano-composites formed by photopolymerization of an acrylate monomer—Copyright © 2015 Published by Elsevier B.V., 2 pages.

(Continued)

*Primary Examiner* — Jessica M Roswell

(74) *Attorney, Agent, or Firm* — HPI Patent Department

(57) ABSTRACT

The present disclosure is drawn to material sets for 3-dimensional printing, 3-dimensional printing systems, and 3-dimensional printed parts. A material set can include a thermoplastic polymer powder having an average particle size from 20 μm to 100 μm, a photoluminescent ink including a photoluminescent agent, and a fusing ink. The fusing ink can include a fusing agent capable of absorbing electromagnetic radiation to produce heat.

15 Claims, 3 Drawing Sheets

(56) References Cited

U.S. PATENT DOCUMENTS

| | | | |
|---|---|---|---|
| 2008/0149164 A1* | 6/2008 | Goedmakers | C08L 69/005 136/247 |
| 2008/0192074 A1 | 8/2008 | Dubois et al. | |
| 2009/0004381 A1 | 1/2009 | Fujisawa et al. | |
| 2009/0215209 A1 | 8/2009 | Anc et al. | |
| 2009/0256273 A1 | 10/2009 | Yu | |
| 2010/0032935 A1 | 2/2010 | Heer et al. | |
| 2010/0140550 A1 | 6/2010 | Keller et al. | |
| 2011/0049865 A1 | 3/2011 | Bray | |
| 2011/0217544 A1 | 9/2011 | Young et al. | |
| 2012/0106437 A1 | 5/2012 | Seo et al. | |
| 2012/0130530 A1 | 5/2012 | Yasukochi | |
| 2012/0202022 A1 | 8/2012 | Schulze | |
| 2014/0261031 A1 | 9/2014 | Kellar et al. | |
| 2014/0263667 A1 | 9/2014 | Mege | |
| 2014/0263674 A1 | 9/2014 | Cerveny | |
| 2014/0275317 A1 | 9/2014 | Moussa | |
| 2015/0235069 A1 | 8/2015 | Kumar et al. | |
| 2015/0258770 A1 | 9/2015 | Chan et al. | |
| 2015/0291921 A1 | 10/2015 | Rives et al. | |
| 2015/0343673 A1 | 12/2015 | Williams | |
| 2015/0361286 A1 | 12/2015 | Williams | |
| 2016/0054474 A1 | 2/2016 | Harmon | |
| 2016/0067659 A1 | 3/2016 | Williams | |
| 2016/0167299 A1 | 6/2016 | Jallouli et al. | |
| 2016/0229119 A1 | 8/2016 | Renn et al. | |
| 2016/0257071 A1 | 9/2016 | Okamoto | |
| 2016/0322703 A1 | 11/2016 | Jesme et al. | |
| 2016/0339636 A1 | 11/2016 | De et al. | |
| 2017/0028618 A1 | 2/2017 | Robeson et al. | |
| 2017/0225396 A1 | 8/2017 | Tom et al. | |
| 2017/0239889 A1 | 8/2017 | Ganapathiappan et al. | |
| 2017/0247552 A1 | 8/2017 | Prasad et al. | |
| 2017/0247553 A1 | 8/2017 | Ganapathiappan et al. | |
| 2018/0015663 A1 | 1/2018 | Zhao et al. | |
| 2019/0022930 A1 | 1/2019 | Hinch et al. | |
| 2019/0137664 A1 | 5/2019 | Stasiak | |

FOREIGN PATENT DOCUMENTS

| | | |
|---|---|---|
| CN | 101102905 | 1/2008 |
| CN | 101556345 | 10/2009 |
| CN | 101819647 | 9/2010 |
| CN | 101870218 | 10/2010 |
| CN | 1976799 | 4/2012 |
| CN | 103755889 | 4/2014 |
| CN | 103991217 | 8/2014 |
| CN | 104149350 | 11/2014 |
| CN | 105346089 | 2/2016 |
| CN | 105392618 | 3/2016 |
| CN | 204036857 U | 12/2016 |
| EP | 04771453.0 | 5/2011 |
| EP | 2952360 | 12/2015 |
| EP | 2969482 | 1/2016 |
| JP | H04099203 | 3/1992 |
| JP | H08156393 | 6/1996 |
| JP | 2000234104 | 8/2000 |
| JP | 2003504199 | 2/2003 |
| JP | 2005254534 | 9/2005 |
| JP | 2006274077 | 10/2006 |
| JP | 2007-100062 A | 4/2007 |
| JP | 2007529340 | 10/2007 |
| JP | 2007534524 | 11/2007 |
| JP | 2009298146 | 12/2009 |
| JP | 2010001425 | 1/2010 |
| JP | 2011129787 | 6/2011 |
| JP | 2012-106437 A | 6/2012 |
| JP | 2015112836 | 6/2015 |
| JP | 2015-171781 A | 10/2015 |
| JP | 2015174426 | 10/2015 |
| JP | 2015221526 | 12/2015 |
| JP | 2017057467 | 3/2017 |
| JP | 2017510475 | 4/2017 |
| KR | 10-2014-0069021 A | 6/2014 |
| KR | 20140069021 | 6/2014 |
| WO | WO-2000041673 | 7/2000 |
| WO | WO-200138061 A1 | 5/2001 |
| WO | WO-2004063295 | 7/2004 |
| WO | 2005/057245 A2 | 6/2005 |
| WO | WO-2005090055 | 9/2005 |
| WO | WO-201 4076049 | 5/2014 |
| WO | 2015/056232 A1 | 4/2015 |
| WO | WO-2015063399 | 5/2015 |
| WO | WO-2015102938 | 7/2015 |
| WO | WO-2015106816 A1 | 7/2015 |
| WO | WO-2015164234 A1 | 10/2015 |
| WO | WO-2015164234 A1 | 10/2015 |
| WO | WO-2015167530 | 11/2015 |
| WO | WO-2016048375 | 3/2016 |
| WO | WO-2016048380 A1 | 3/2016 |
| WO | WO-2016/053248 | 4/2016 |
| WO | WO-2017188961 | 4/2016 |
| WO | WO-2016175817 | 11/2016 |
| WO | WO-2017188963 | 11/2017 |
| WO | WO-2018022051 | 2/2018 |

OTHER PUBLICATIONS

Doubrovski, E.L. et al., Voxel-based fabrication through material property mapping: A design method for bitmap printing, Mar. 2015, 3 pages.
Golembiewski, K., At Rapid, HP Shows Production-Ready 3D Printing System, May 17, 2016,3 pages.
HP Delivers World's First Production-Ready 3D Printing System, May 17, 2016, 3 pages.
Siemens to Collaborate with HP Inc. to Elevate 3D Printing from Prototyping to Full Production, May 17, 2016, 2 pages.
Additive manufacturing of graded dielectrics.
Tang Jinfa, "Thin Film Optics and Technology", Jun. 30, 1989, pp. 153-155,China Machine Press.

* cited by examiner

PHOTOLUMINESCENT MATERIAL SETS

BACKGROUND

Methods of 3-dimensional (3D) digital printing, a type of additive manufacturing, have continued to be developed over the last few decades. Various methods for 3D printing have been developed, including heat-assisted extrusion, selective laser sintering, photolithography, as well as others. In general, 3D printing technology improves the product development cycle by allowing rapid creation of prototype models for reviewing and testing.

Figure 1:
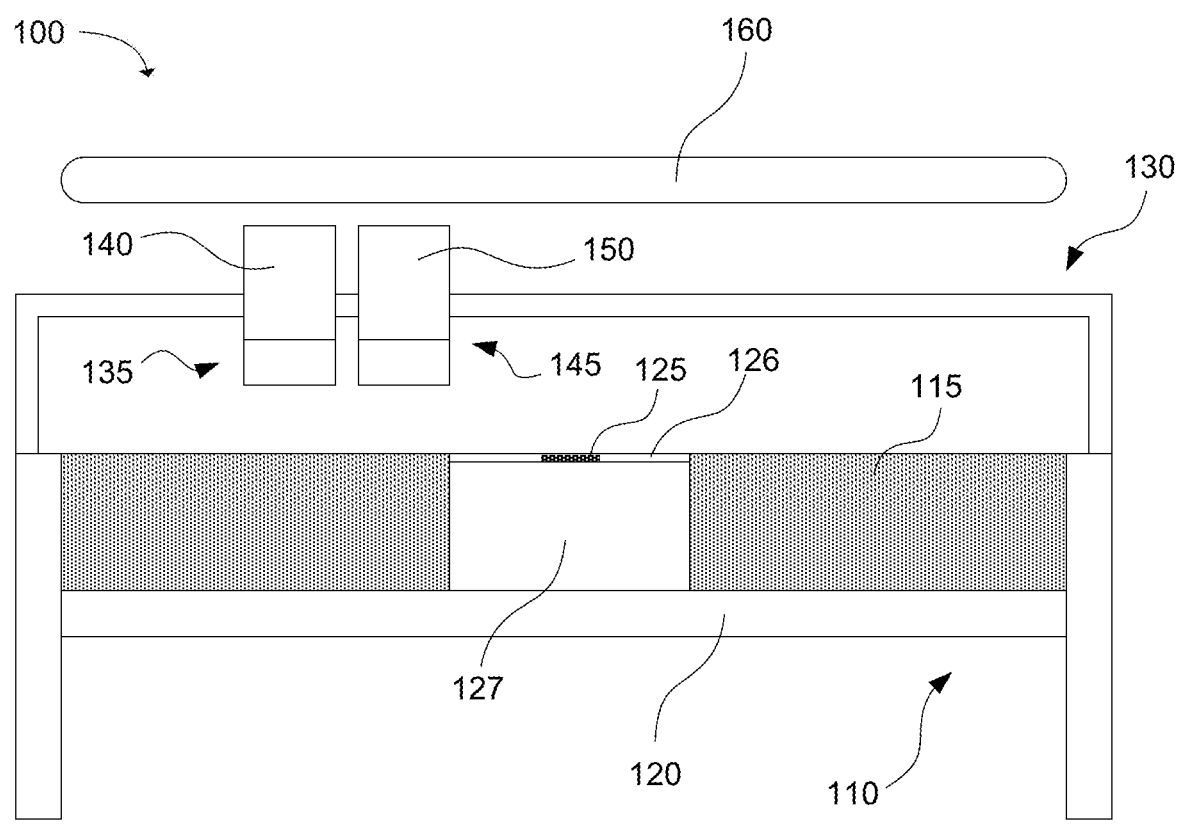
FIG. 1 is a schematic view of a 3-dimensional printing system in accordance with examples of the present disclosure.

The figures depict several examples of the presently disclosed technology. However, it should be understood that the present technology is not limited to the examples depicted.

DETAILED DESCRIPTION

The present disclosure is drawn to the area of 3-dimensional printing. More specifically, the present disclosure provides photoluminescent material sets and systems for printing 3-dimensional parts with photoluminescent features printed on the surface thereof. In an exemplary printing process, a thin layer of polymer powder can be spread on a bed to form a powder bed. A printing head, such as an inkjet print head, can then be used to print a fusing ink over portions of the powder bed corresponding to a thin layer of the three dimensional object to be formed. Then the bed can be exposed to a light source, e.g., typically the entire bed. The fusing ink absorbs more energy from the light than the unprinted powder. The absorbed light energy can be converted to thermal energy, causing the printed portions of the powder to melt and coalesce. This can form a solid layer. After the first layer is formed, a new thin layer of polymer powder can be spread over the powder bed and the process can be repeated to form additional layers until a complete 3-dimensional part is printed. Such 3-dimensional printing processes can achieve fast throughput with good accuracy.

In some examples of the presently disclosed technology, a photoluminescent ink can be used together with a fusing ink to form 3-dimensional printed parts with photoluminescent features. The photoluminescent ink can be jetted on portions of the powder bed where photoluminescence may be desired, and the fusing ink can be jetted on the same portions and other portions of the powder bed to form the final printed part. The materials, systems, and methods described herein can be used to print parts having a variety of covert surface security or serialization features that can be detected using photoluminescent imaging techniques. Non-limiting examples of such security or serialization features can include bar codes, quick response (QR) codes, trademarks, tradenames, instructions, other words, the like, and combinations thereof.

In some examples of the present disclosure, a material set, such as for 3-dimensional printing, can include a thermoplastic polymer powder, a photoluminescent ink, and a fusing ink. The photoluminescent ink can include a photoluminescent agent and the fusing ink can include a fusing agent capable of absorbing electromagnetic radiation to produce heat.

More specifically, the thermoplastic polymer powder can include powder particles with an average particle size from 20 µm to 100 µm. As used herein, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles.

In certain examples, the polymer particles can have a variety of shapes, such as substantially spherical particles or irregularly-shaped particles. In some examples, the polymer powder can be capable of being formed into 3D printed parts with a resolution of 20 to 100 microns. As used herein, "resolution" refers to the size of the smallest feature that can be formed on a 3D printed part. The polymer powder can form layers from about 20 to about 100 microns thick, allowing the fused layers of the printed part to have roughly the same thickness. This can provide a resolution in the z-axis direction of about 20 to about 100 microns. The polymer powder can also have a sufficiently small particle size and sufficiently regular particle shape to provide about 20 to about 100 micron resolution along the x-axis and y-axis.

In some examples, the thermoplastic polymer powder can be colorless. For example, the polymer powder can have a white, translucent, or transparent appearance. When used with a colorless fusing ink, such polymer powders can provide a printed part that is white, translucent, or transparent. In other examples, the polymer powder can be colored for producing colored parts. In still other examples, when the polymer powder is white, translucent, or transparent, color can be imparted to the part by the fusing ink or another colored ink.

The thermoplastic polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, or combinations thereof. In a specific example, the polymer powder can be nylon 12, which can have a melting point from about 175° C. to about 200° C. In another specific example, the polymer powder can be thermoplastic polyurethane.

The thermoplastic polymer powder can also in some cases be blended with a filler. The filler can include inorganic particles such as alumina, silica, or combinations thereof. When the thermoplastic polymer powder fuses together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer powder to filler particles can be from 10:1 to 1:2 or from 5:1 to 1:1.

Material sets in accordance with the present technology can also include a fusing ink. In some examples, the fusing ink can be devoid or substantially devoid of the photoluminescent agent contained in the photoluminescent ink. The fusing ink can contain a fusing agent that is capable of absorbing electromagnetic radiation to produce heat. The fusing agent can be colored or colorless. In various examples, the fusing agent can be carbon black, near-infrared absorbing dyes, near-infrared absorbing pigments, tungsten bronzes, molybdenum bronzes, metal nanoparticles, or combinations thereof.

Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the fusing agent can have a peak absorption wavelength in the range of 800 nm to 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. The silicates can have the same or similar counterions as the phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

The amount of fusing agent in the fusing ink can vary depending on the type of fusing agent. In some examples, the concentration of fusing agent in the fusing ink can be from 0.1 wt % to 20 wt %. In one example, the concentration of fusing agent in the fusing ink can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %.

In some examples, the fusing ink can have a black or gray color due to the use of carbon black as the fusing agent. However, in other examples the fusing ink can be colorless or nearly colorless. The concentration of the fusing agent can be adjusted to provide a fusing ink in which the visible color of the fusing ink is not substantially altered by the fusing agent. Although some of the above described fusing agents can have low absorbance in the visible light range, the absorbance is usually greater than zero. Therefore, the fusing agents can typically absorb some visible light, but their color in the visible spectrum can be minimal enough that it does not substantially impact the ink's ability to take on another color when a colorant is added (unlike carbon black which dominates the ink's color with gray or black tones). The fusing agents in concentrated form can have a visible color, but the concentration of the fusing agents in the fusing ink can be adjusted so that the fusing agents may not be present in such high amounts that they alter the visible color of the fusing ink. For example, a fusing agent with a very low absorbance of visible light wavelengths can be included in greater concentrations compared to a fusing agent with a relatively higher absorbance of visible light. These concentrations can be adjusted based on a specific application with some experimentation.

In further examples, the concentration of the fusing agent can be high enough that the fusing agent impacts the color of the fusing ink, but low enough that when the ink is printed on the thermoplastic polymer powder, the fusing agent does not impact the color of the powder. The concentration of the fusing agent can be balanced with the amount of fusing ink to be printed on the polymer powder so that the total amount of fusing agent printed onto the polymer powder can be low enough that the visible color of the polymer powder is not impacted. In one example, the fusing agent can have a concentration in the fusing ink such that after the fusing ink is printed onto the polymer powder, the amount of fusing agent in the polymer powder is from 0.0003 wt % to 5 wt % with respect to the weight of the polymer powder.

The fusing agent can have a temperature boosting capacity sufficient to increase the temperature of the polymer powder above the melting or softening point of the polymer powder. As used herein, "temperature boosting capacity" refers to the ability of a fusing agent to convert near-infrared light energy into thermal energy to increase the temperature of the printed polymer powder over and above the temperature of the unprinted portion of the polymer powder. Typically, the polymer powder particles can be fused together when the temperature increases to the melting or softening temperature of the polymer. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer particles coalesce while the remaining powder remains separate and loose. When the fusing ink is printed on a portion of the polymer powder, the fusing agent can heat the printed portion to a temperature at or above the melting or softening point, while the unprinted portions of the polymer powder remain below the melting or softening point. This allows the formation of a solid 3D printed part, while the loose powder can be easily separated from the finished printed part.

Although melting point and softening point are often described herein as the temperatures for coalescing the polymer powder, in some cases the polymer particles can coalesce together at temperatures slightly below the melting point or softening point. Therefore, as used herein "melting point" and "softening point" can include temperatures slightly lower, such as up to about 20° C. lower, than the actual melting point or softening point.

In one example, the fusing agent can have a temperature boosting capacity from about 10° C. to about 70° C. for a polymer with a melting or softening point from about 100° C. to about 350° C. If the powder bed is at a temperature within about 10° C. to about 70° C. of the melting or softening point, then such a fusing agent can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The fusing ink can then be printed onto the powder and the powder bed can be irradiated with a near-infrared light to coalesce the printed portion of the powder.

The material set can also include a photoluminescent ink. The photoluminescent ink can include a photoluminescent agent. Any jettable photoluminescent agent can be used. A photoluminescent agent can be any agent that exhibits photoluminescence. "Photoluminescence," as used herein, refers to an emission of light by a substance as a result of the absorbance of a photon by that substance. More specifically, absorption of a photon by a photoluminescent agent can induce photoexcitation of the photoluminescent agent. Photoexcitation refers to the excitation of electrons within the photoluminescent agent due to the absorption of the photon. The photoexcitation of the photoluminescent agent can be followed by a relaxation event, where the excited electrons relax back to a lower energy state. The relaxation of the excited electrons can be accompanied by the emission of a photon from the photoluminescent agent. Typically, the photoluminescent agent can absorb photons at a different wavelength of electromagnetic radiation than the wavelength of the emitted photon.

As such, in some examples, these photoluminescent agents can be "tuned" to photoexcite at wavelengths within the Ultraviolet (UV) range and to photoluminesce within the visible range. This can allow the photoluminescent agent to remain covert until irradiated with a photoexciting wavelength of electromagnetic radiation. In other examples, the photoluminescent agent can be "tuned" to photoexcite at one wavelength within the visible range and to emit at a different wavelength within the visible range.

Non-limiting examples of photoluminescent agents can include a photoluminescent pigment, a photoluminescent dye, a quantum dot, the like, or combinations thereof. In some examples, the photoluminescent agent can include a fluorescent agent, a phosphorescent agent, or a combination thereof. In some examples, photoluminescent dyes can be enclosed within, distributed throughout, or otherwise associated with a microparticle or nanoparticle. In some examples, photoluminescent pigments can include a photoluminescent nanoparticle and/or a photoluminescent microparticle. For example, a photoluminescent pigment or dye can be coupled to a surface of a microparticle or nanoparticle, embedded within the microparticle or nanoparticle, distributed throughout the microparticle or nanoparticle, or otherwise associated with a microparticle or nanoparticle. As used herein, "microparticle" refers to a particle having a particle size of about 100 nm to about 100 µm. As used herein, "nanoparticle" refers to a particle having a particle size of about 1 nm to about 100 nm.

Numerous photoluminescent pigments and/or dyes can be used. Non-limiting examples can include europium doped strontium aluminates, thallium doped sodium iodides, activated alkaline earth metal sulfides, activated alkaline earth metal silicates, rhodamines, acridines, fluorines, cyanines, oxazines, phenanthridines, pyrrolopyrroles, benzoxazoles, benzothiazoles, azo pigments, azo-metal complexes, bisacetoacetarylides, azomethines, arylmethines, benzimidazolones, diazopyrazolones, quinacridones, quinones, flavanthrones, perinones, isoindolines, isoindolinones, perylenes, phthalocyanines, metal-phthalocyanine complexes, porphyrins, metal-porphyrin complexes, polyenes, polymethines, squaraines, or combinations thereof. In one specific example, a photoluminescent dye can be fluorescein. In another specific example, a photoluminescent dye can be rhodamine B. As previously described, dyes or pigments can be associated with microparticles or nanoparticles. Non-limiting commercially available examples can include Fluoresbrite® microspheres, such as YG Carboxylate Microspheres, YO Carboxylate Microspheres, NYO Carboxylate Microspheres, BB Carboxylate Microspheres, and EU Carboxylate Microspheres available from Polysciences, Inc.

Where the photoluminescent agent is a particulate (e.g., a photoluminescent pigment, photoluminescent nanoparticle, etc.), the photoluminescent agent can have a particle size from about 10 nm to about 400 nm or 500 nm, or from about 20 nm to about 200 nm or 300 nm, or from about 30 nm to about 70 nm or 120 nm.

Quantum dots can also be used as a photoluminescent agent. Quantum dots can be very small semiconductor particles that typically have a particle size of about 20 nm or less. Quantum dots can be made of a variety of semiconductor materials. For example, quantum dots can be made of a single element, such as silicon, germanium, and the like. Alternatively, quantum dots can be compounds of materials, such as indium phosphide, indium arsenide, zinc sulfide, lead sulfide, cadmium sulfide, lead selenide, cadmium selenide, the like, or combinations thereof. Other quantum dots that can be used include I-III-VI quantum dots, including, for example $CuInS_x$ or $CuInSe_x$ quantum dots, where x may be 1 or 2. Non-limiting commercially available quantum dots can include Indium Phosphide Zinc Sulfide Quantum Dots in Water and Cadmium Selenide Zinc Sulfide Quantum Dots in Water from NN-Labs, and NanoDOT™ CIS-500 and NanoDOT™ CIS-700 from Voxtel, Inc.

Quantum dots can be prepared in a number of ways. For example, the quantum dots can be made of a single component with uniform composition throughout (e.g., silicone, zinc sulfide, etc.). The photoluminescence of these quantum dots can be tunable merely by adjusting the size of the quantum dot. In other examples, the quantum dots can be prepared with a core material having a lower band gap surrounded by a shell material having a higher band gap. As one example, the core material can be cadmium selenide and the shell material can be zinc sulfide. The photoluminescence of these quantum dots can be tunable based on both particle size and the specific combination of core and/or shell materials. In other examples, the quantum dots can be prepared by alloying different quantum dots particles together, such as indium phosphide and zinc sulfide, or cadmium selenide and zinc sulfide, or any other suitable alloy of quantum dot particles. These quantum dots can also be tuned based on both size and the specific alloy used.

As previously described, quantum dots can typically have a particle size of about 20 nm or less. Generally, the larger the particle size of the quantum dot, the longer the photoluminescent emission wavelength will be. Conversely, the smaller the particle size of the quantum dot, the shorter the photoluminescent emission wavelength will be. In some examples, the quantum dots can have a particle size from about 2 nm to about 10 nm. In other examples, the quantum dots can have a particle size from about 4 nm to about 8 nm. In other examples, the quantum dots can have a particle size from about 8 nm to about 14 nm.

The amount of photoluminescent agent in the photoluminescent ink can vary depending on the type of photoluminescent agent. In some examples, the concentration of photoluminescent agent in the photoluminescent ink can be from 0.01 wt % to 10 wt %. In one example, the concentration of photoluminescent agent in the photoluminescent ink can be from 0.05 wt % to 8 wt %. In another example, the concentration can be from 0.1 wt % to 5 wt %. In yet another example, the concentration can be from 0.1 wt % to 3 wt %. In a particular example, the concentration can be from 0.5 wt % to 1.5 wt %.

When the photoluminescent ink is printed onto a layer of the thermoplastic polymer powder, the photoluminescent ink can penetrate into the spaces between powder particles. The fusing ink or a second fusing ink can also be printed onto the layer in the same areas as the photoluminescent ink. The layer can then be cured by exposing the layer to electromagnetic radiation. In some examples, the photoluminescent ink can include the fusing agent or a second fusing agent. In other examples, the photoluminescent ink can be printed with the fusing ink and/or a second fusing ink to facilitate fusing of the thermoplastic polymer. In either scenario, the temperature of the powder can be raised above the melting or softening point of the thermoplastic polymer so as to facilitate the fusing process.

In further examples, the material set can also include colored inks for adding color to the thermoplastic polymer powder. In some examples, colored inks can also facilitate masking of specific photoluminescent inks that would otherwise be visible under ambient lighting. The colored inks can include any suitable colorant, including dyes and/or pigments. This can allow for printing of full-color 3-dimensional parts. In one example, the material set can include cyan, magenta, yellow, and black inks in addition to the photoluminescent ink, fusing ink, and other inks, if present.

Alternatively, any of the above described inks can also include a pigment or dye colorant that imparts a visible color to the inks. In some examples, the colorant can be present in an amount from 0.5 wt % to 10 wt % in the inks. In one example, the colorant can be present in an amount from 1 wt % to 5 wt %. In another example, the colorant can be present in an amount from 5 wt % to 10 wt %. However, the colorant is optional and in some examples the inks can include no additional colorant. These inks can be used to print 3D parts that retain the natural color of the polymer powder. Additionally, the inks can include a white pigment such as titanium dioxide that can also impart a white color to the final printed part. Other inorganic pigments such as alumina or zinc oxide can also be used.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine 0, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule: or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow SGT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the above described inks and/or ultimately, the printed part.

The colorant can be included in the photoluminescent ink and/or the fusing ink to impart color to the printed object when the fusing inks are jetted onto the powder bed.

Optionally, a set of differently colored fusing inks can be used to print multiple colors. For example, a set of fusing inks including any combination of cyan, magenta, yellow (and/or any other colors), colorless, white, and/or black fusing inks can be used to print objects in full color. Alternatively or additionally, a colorless fusing ink can be used in conjunction with a set of colored, non-fusing inks to impart color. In some examples, a colorless fusing ink can be used to coalesce the polymer powder and a separate set of colored or black or white inks not containing a fusing agent can be used to impart color.

The components of the above described inks can be selected to give the inks good ink jetting performance and the ability to color the polymer powder with good optical density. Besides the photoluminescent agents, fusing agents, colorants and other ingredients described above, the inks can also include a liquid vehicle. In some examples, the liquid vehicle formulation can include water and an additional co-solvent or co-solvents present in total at from 1 wt % to 50 wt %, depending on the jetting architecture. Further, a non-ionic, cationic, and/or anionic surfactant can optionally be present, ranging from 0.01 wt % to 20 wt %. In one example, the surfactant can be present in an amount from 5 wt % to 20 wt %. The liquid vehicle can also include dispersants in an amount from 5 wt % to 20 wt %. The balance of the formulation can be purified water, or other vehicle components such as biocides, viscosity modifiers, materials for pH adjustment, sequestering agents, preservatives, and the like. In one example, the liquid vehicle can be predominantly water. In some examples, a water-dispersible or water-soluble fusing agent can be used with an aqueous vehicle. Because the fusing agent is dispersible or soluble in water, an organic co-solvent is not necessary to solubilize the fusing agent. Therefore, in some examples the inks can be substantially free of organic solvent. However, in other examples a co-solvent can be used to help disperse other dyes or pigments, or improve the jetting properties of the ink. In still further examples, a non-aqueous vehicle can be used with an organic-soluble or organic-dispersible fusing agent.

In certain examples, a high boiling point co-solvent can be included in the inks. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present in the ink at a concentration from about 1 wt % to about 4 wt %.

Classes of co-solvents that can be used can include organic co-solvents including aliphatic alcohols, aromatic alcohols, dials, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

A surfactant, or combination of surfactants, can also be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulation of this disclosure, various other additives can be employed to optimize the properties of the ink compositions for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R. T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives to modify properties of the ink as desired. Such additives can be present at from 0.01 wt % to 20 wt %.

Each of the photoluminescent ink, fusing ink, and additional colored inks can be formulated for use in an ink jet printer. The photoluminescent agent and fusing agents can be stable in an ink jet ink vehicle and the inks can provide good ink jetting performance. In some examples, the photoluminescent agents and fusing agents can be water-soluble, water-dispersible, organic-soluble, or organic-dispersible. The photoluminescent agents and fusing agents can also be compatible with the thermoplastic polymer powder so that jetting the inks onto the polymer powder provides adequate coverage and interfiltration of the photoluminescent agents and fusing agents into the powder.

In addition to the material sets described above, the present technology also encompasses 3-dimensional printing systems that include the material sets. An example of a 3-dimensional printing system 100 is shown in FIG. 1. The system includes a powder bed 110 including a thermoplastic polymer powder 115 having an average particle size from 20 μm to 100 μm. In the example shown, the powder bed has a moveable floor 120 that allows the powder bed to be lowered after each layer of the 3-dimensional part is printed. The 3-dimensional printed part can include a photoluminescent composite layer 126, including a photoluminescent composite portion 125, applied to a surface of a part body 127. The system also includes an inkjet printer 130 that includes a first inkjet pen 135 in communication with a reservoir of a photoluminescent ink 140. The first inkjet pen can print the photoluminescent ink onto the powder bed. A second inkjet pen 145 is in communication with a reservoir of a fusing ink 150. The second inkjet pen can print the fusing ink onto the powder bed. After the fusing ink has been printed onto the powder bed, a fusing lamp 160 can be used to expose the powder bed to electromagnetic radiation sufficient to fuse the powder that has been printed with the fusing inks.

The material set used in the 3-dimensional printing system can include any of the components and ingredients described above. In a particular example, thermoplastic polymer powder can include a nylon, a thermoplastic elastomer, a urethane, a polycarbonate, a polystyrene, or a combination thereof. In another example, the photoluminescent agent can include a photoluminescent pigment, a photoluminescent dye, a quantum dot, or a combination thereof. In another example, the fusing agent in the fusing ink can include carbon black, a near-infrared absorbing dye, a near-infrared absorbing pigment, a tungsten bronze, a molybdenum bronze, metal nanoparticles, a conjugated polymer, or combinations thereof.

In some examples, the 3-dimensional printing system can also include a third inkjet pen in communication with a reservoir of colored ink to print the colored ink onto the powder bed. In further examples, the 3-dimensional printing system can include additional inkjet pens for additional photoluminescent inks, additional fusing inks, or other suitable inks.

To achieve good selectivity between the fused and unfused portions of the powder bed, the fusing inks can absorb enough energy to boost the temperature of the thermoplastic polymer powder above the melting or softening point of the polymer, while unprinted portions of the powder bed remain below the melting or softening point. In some examples, the 3-dimensional printing system can include preheaters for preheating the thermoplastic polymer powder to a temperature near the melting or softening point. In one example, the system can include a print bed heater to heat the print bed during printing. The preheat temperature used can depend on the type of thermoplastic polymer used. In some examples, the print bed heater can heat the print bed to a temperature from 130° C. to 160° C. The system can also include a supply bed, where polymer particles can be stored before being spread in a layer onto the print bed. The supply bed can have a supply bed heater. In some examples, the supply bed heater can heat the supply bed to a temperature from 90° C. to 140° C.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can irradiate the entire powder bed with a substantially uniform amount of energy. This can selectively coalesce the printed portions with fusing inks leaving the unprinted portions of the polymer powder below the melting or softening point.

In one example, the fusing lamp can be matched with the fusing agents in the fusing inks so that the fusing lamp emits wavelengths of light that match the peak absorption wavelengths of the fusing agents. A fusing agent with a narrow peak at a particular near-infrared wavelength can be used with a fusing lamp that emits a narrow range of wavelengths at approximately the peak wavelength of the fusing agent. Similarly, a fusing agent that absorbs a broad range of near-infrared wavelengths can be used with a fusing lamp that emits a broad range of wavelengths. Matching the fusing agent and the fusing lamp in this way can increase the efficiency of coalescing the polymer particles with the fusing agent printed thereon, while the unprinted polymer particles do not absorb as much light and remain at a lower temperature.

Depending on the amount of fusing agent present in the polymer powder, the absorbance of the fusing agent, the preheat temperature, and the melting or softening point of the polymer, an appropriate amount of irradiation can be supplied from the fusing lamp. In some examples, the fusing lamp can irradiate each layer from about 0.5 to about 10 seconds per pass.

The present technology also extends to 3-dimensional printed parts formed from the materials described herein. In one example, a 3-dimensional printed part can include a part body including multiple layers of fused thermoplastic polymer powder. The 3-dimensional printed part can also include a photoluminescent composite layer applied to a surface of the part body. The photoluminescent composite layer can include a photoluminescent agent dispersed in a matrix of fused thermoplastic polymer powder, wherein the photoluminescent agent can be present both beneath and at a surface of the photoluminescent composite layer.

Figure 2:
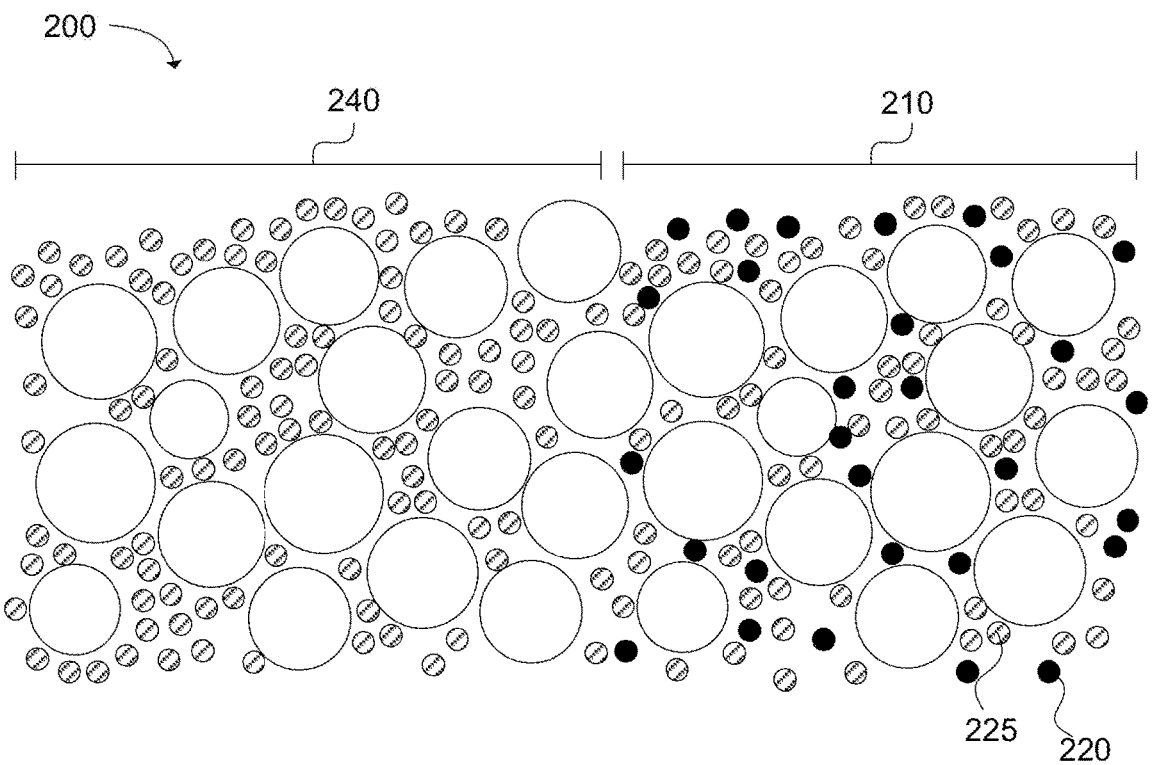
FIG. 2 is a close-up side cross-sectional view of a layer of thermoplastic polymer powder with a photoluminescent ink printed on a portion of the layer in accordance with examples of the present disclosure.
Figure 3:
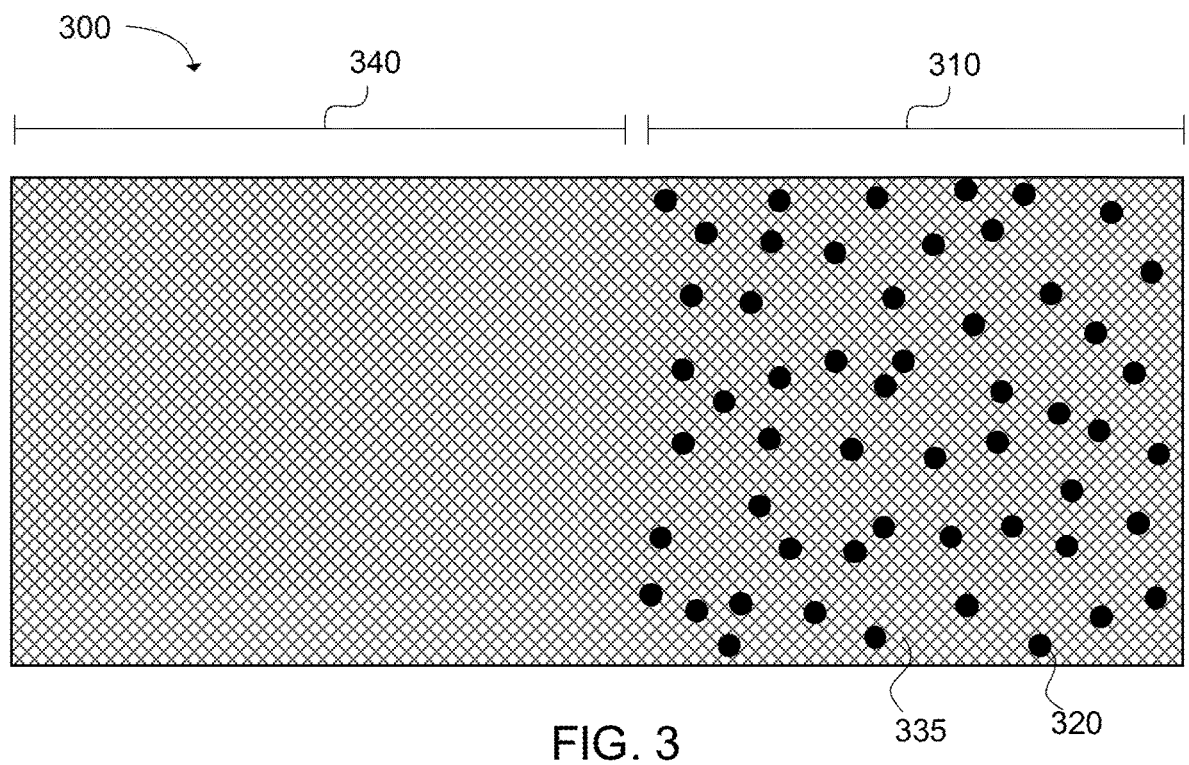
FIG. 3 is a close-up side cross-sectional view of the layer of FIG. 2 after the layer has been cured in accordance with examples of the present disclosure.

The formation of the photoluminescent composite layer described above is illustrated in FIGS. 2-3. FIGS. 2-3 are close-up cross sectional views of a layer of the thermoplastic polymer powder bed that has been printed with a photoluminescent ink and a fusing ink. FIG. 2 shows the powder layer 200 after being printed but before being cured, and FIG. 3 shows the coalesced powder layer 300 after being cured. In FIG. 2, a first portion 210 of the powder layer 200 has been printed with a photoluminescent ink containing photoluminescent agent 220 and with fusing ink containing fusing agent 225. The photoluminescent agent penetrates into the spaces between the powder particles 230. A second portion 240 of the powder layer has been printed with a fusing ink including a fusing agent, but without photoluminescent ink. Thus, as shown, only a portion of the photoluminescent composite layer includes the photoluminescent agent. However, in some examples, the photoluminescent agent can be printed throughout the entire photoluminescent composite layer. It should be noted that these figures are not necessarily drawn to scale, and the relative sizes of powder particles and photoluminescent agent particles can differ from those shown. However, the photoluminescent agent need not be in the form of particles.

As shown in FIG. 3, when the powder layer 300 is cured by exposure to electromagnetic radiation, the dispersed photoluminescent agent 320 can be entrapped throughout a portion of a matrix 335 formed by fusing agent in the ink and the powder particles in the first portion 310. Thus, the photoluminescent agent entrapped in the matrix of fused thermoplastic polymer powder can form the photoluminescent composite layer. It should be noted that FIGS. 2 and 3 show only a 2-dimensional cross-section of a portion of a photoluminescent composite layer. Further, the photoluminescent agent is illustrated in FIGS. 2 and 3 as completely penetrating the layer of thermoplastic polymer powder. However, this is not necessary. In some examples, the photoluminescent agent can extend into the photoluminescent composite layer to a depth greater than about 20%, about 50%, about 70%, or about 90% of the thickness of the layer.

Sufficient photoluminescence in the photoluminescent composite layer can be achieved by dispensing a sufficient amount of photoluminescent agent onto the powder bed. In some examples, a sufficient mass of photoluminescent agent per volume of the photoluminescent composite layer can be used to achieve sufficient photoluminescence. For example, the mass of photoluminescent agent per volume of photoluminescent composite layer can be greater than $0.1$ mg/cm$^3$, greater than 1 mg/cm$^3$, greater than 10 mg/cm$^3$, greater than 50 mg/cm$^3$, or greater than 100 mg/cm$^3$. In a particular example, the mass of photoluminescent agent per volume of the photoluminescent composite layer can be greater than 140 mg/cm$^3$. In further examples, the mass of photoluminescent agent per volume of the photoluminescent composite layer can be from 1 mg/cm$^3$ to 1000 mg/cm$^3$, from 10 mg/cm$^3$ to 1000 mg/cm$^3$, from 50 mg/cm$^3$ to 500 mg/cm$^3$, or from 100 mg/cm$^3$ to 500 mg/cm$^3$.

The part body can be formed of multiple layers of fused thermoplastic polymer powder stacked in a z-axis direction. The z-axis refers to the axis orthogonal to the x-y plane. For example, in 3-dimensional printing systems having a powder bed floor that lowers after each layer is printed, the z-axis is the direction in which the floor is lowered. In some examples, the photoluminescent composite layer can be oriented completely or partially in the z-axis direction. For example, the photoluminescent composite layer can be formed on a surface of the part body that includes components of the z-axis direction and the x- and/or y-axis directions. As one specific example, the photoluminescent composite can be formed on a surface of the part body that is oriented in the x- and/or y-axis direction and the z-axis direction. In other examples, the part body can have a number of surfaces that are oriented completely or partially in the z-axis direction, such as pyramid shapes, spherical shapes, trapezoidal shapes, non-standard shapes, etc. The photoluminescent composite layer can be formed on one of these surfaces, such that the photoluminescent composite can be oriented completely or partially in the z-axis direction. Thus, the photoluminescent composite layer does not necessarily refer to a single layer of contemporaneously deposited thermoplastic polymer powder having photoluminescent agent dispersed therein. In some examples, the photoluminescent composite layer can include any surface of the 3-dimensional printed part and can extend to a depth of from about 20 µm to about 150 µm, or from about 50 µm to about 120 µm within the 3-dimensional printed part, whether it was formed from a single layer of dispersed thermoplastic polymer powder or multiple additive layers of thermoplastic polymer powder.

In some examples, the amount of photoluminescent agent dispensed onto the powder bed can be adjusted by printing the photoluminescent ink in multiple passes. In one example, a single pass of an inkjet printhead can be sufficient to dispense enough photoluminescent agent to achieve adequate photoluminescence of the photoluminescent composite portion. However, in some cases, a single pass may not be sufficient to achieve adequate photoluminescence. Additional passes can be applied to increase the amount of photoluminescent agent in the photoluminescent composite layer. In one example, two, three, or four passes can be used to achieve adequate photoluminescence. However, any suitable number of passes can be used to achieve adequate photoluminescence. In further examples, the amount of photoluminescent agent dispensed can be adjusted by adjusting the drop weight of the inkjet printhead either through resistor design or by changing firing parameters. Thus, with a greater drop weight, a greater amount of the photoluminescent ink can be printed with each drop fired. However, in some cases jetting too large an amount of ink in a single pass can lead to lower print quality because of ink spreading. Therefore, in some examples multiple passes can be used to print more of the photoluminescent ink with better print quality.

In a particular example, a 3-dimensional printed part can be formed as follows. An inkjet printer can be used to print a first pass including printing an photoluminescent ink and a fusing ink onto a first portion of the powder bed. The fusing ink or a second fusing ink can be printed onto a second portion of the powder bed that does not include the photoluminescent ink. A curing pass can then be performed by passing a fusing lamp over the powder bed to fuse the polymer particles and entrap the photoluminescent agent within the fused polymer particles. Then, optionally, additional passes can be performed of printing the photoluminescent ink onto the first portion of the powder bed to increase the amount of photoluminescent agent. Each pass of printing the photoluminescent ink can be followed by a curing pass with the fusing lamp. The number of passes used can depend on the desired photoluminescence, the contone level of the printing passes (referring to the density of ink per area deposited on each pass), the type of photoluminescent agent in the photoluminescent ink, concentration of photoluminescent agent in the photoluminescent ink, thickness of the layer of polymer powder being printed, and so on.

Figure 4:
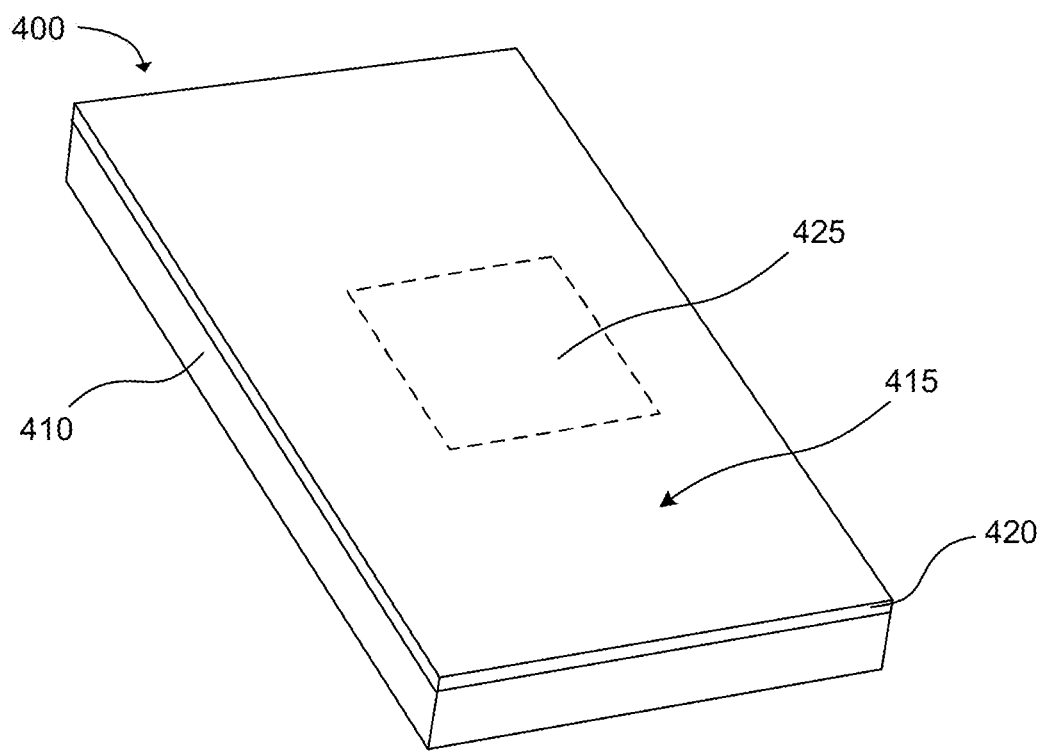
FIG. 4 is a perspective view of a 3-dimensional printed part having a photoluminescent composite layer, in accordance with examples of the present disclosure.

FIG. 4 shows an example of a 3-dimensional printed part 400 that includes a part body 410 and a photoluminescent composite layer 420 applied to a surface of the part body. The photoluminescent composite layer includes a photoluminescent composite portion 425 having a photoluminescent agent dispersed in a matrix of fused thermoplastic polymer powder. It is noted that the photoluminescent agent can be present both beneath the surface 415 and at the surface of the photoluminescent composite layer. It is also noted that the illustrated 3-dimensional printed part can be printed in a number of orientations, such as with the photoluminescent composite portion facing up, facing sideways, etc. It is also noted that, in some examples, the photoluminescent agent can be invisible or relatively unobservable under ambient lighting conditions. As described previously, the photoluminescent agent can be tuned such that it does not absorb electromagnetic radiation in the visible range. Alternatively, the photoluminescent agent can be masked by surrounding colored dyes and/or pigments such that it is not distinguishable until exposed to a specific wavelength of electromagnetic radiation. In some specific examples, the photoluminescent composite can absorb electromagnetic radiation at a wavelength less than 302 nm or 390 nm and can photoluminesce at a wavelength between about 302 nm or about 390 nm to about 700 nm. In other examples, the photoluminescent composite can absorb electromagnetic radiation at a wavelength greater than 700 nm and can photoluminesce at a wavelength between about 302 nm or about 390 nm to about 700 nm. In other examples, the photoluminescent agent can both absorb electromagnetic radiation and photoluminesce at wavelengths within the visible range (e.g., about 380 or about 390 nm to about 700 nm or 750 nm). In this particular example, the photoluminescent agent can be masked by printing it with similarly colored colorants, rendering the photoluminescent agent indistinguishable from the non-photoluminescent colorants until irradiated with photoexciting electromagnetic radiation. As non-limiting examples, fluorescein can be printed with other similar yellow colorants, or rhodamine B can be printed with other similar magenta colorants to mask these photoluminescent agents until irradiated with photoexciting electromagnetic radiation. Upon photoexcitation, the printed pattern of the fluorescein or rhodamine B can become clearly distinguishable from the surrounding colorants.

It is noted that the photoluminescence of the photoluminescent composite can be affected by the type and amount photoluminescent agent present in the composite, as well as the type and amount of fusing ink or other inks, and the type and amount of thermoplastic polymer present relative to the photoluminescent agent. Thus, the photoluminescent composite can have different photoluminescent properties than the photoluminescent agent alone. Nonetheless, in some examples, the photoluminescent composite portion can be invisible or relatively unobservable under ambient lighting, as is illustrated in FIG. 4.

Figure 5:
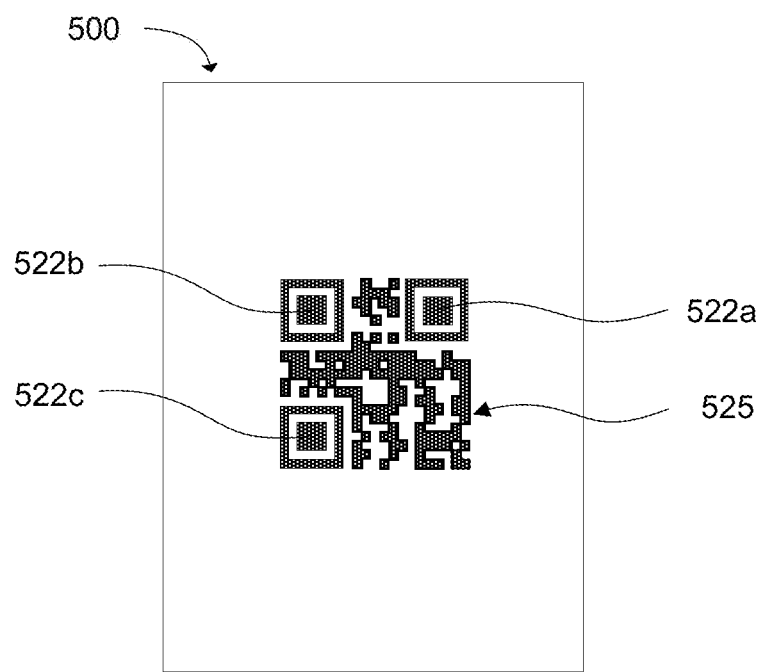
FIG. 5 is a top plan view of the 3-dimensional printed part of FIG. 4 where the photoluminescent composite layer is in a photoluminescent state, in accordance with examples of the present disclosure.

However, as illustrated in FIG. 5, the photoluminescent composite portion 525 of 3-dimensional printed part 500 can be clearly distinguished from non-photoluminescent portions of the photoluminescent composite layer during photoluminescence. In this particular example, the photoluminescent composite portion photoluminesces after photoexcitation to reveal a QR code. In alternative embodiments, the photoluminescent composite portion can photoluminesce to present a bar code, a serial number, a trademark, a tradename, instructions, other words, the like, or a combination thereof.

In an alternative embodiment, the 3-dimensional printed part 500 can be printed such that the QR code can be clearly visible under ambient lighting and can be decoded using standard QR code algorithms. However, features 522a, 522b, and 522c can each be printed to have different photoluminescent features. For example, these features can be printed with photoluminescent agents that photoexcite at different wavelengths of electromagnetic radiation, with different amounts of photoluminescent agent to provide different photoluminescent intensities, with different mixtures of photoluminescent agents, etc., or a combination thereof. This can provide additional information encoded in the spatial attributes of the luminescent composite that can only be readable during specific photoluminescent events. Thus, these QR codes can be read using standard QR code algorithms under ambient lighting, but can be read using a specific QR code algorithm during photoluminescence to provide additional information. The same concept can also be employed with bar codes and other identifying or serialization information. Thus, photoluminescent inks can provide increased information payloads for printed security and serialization features.

It is noted that, as used in this specification and the appended claims, the singular forms "a," "an," and "the" include plural referents unless the context clearly dictates otherwise.

As used herein, "liquid vehicle" or "ink vehicle" refers to a liquid fluid in which additives are placed to form inkjettable fluids, such as inks. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and fusing agents, the liquid vehicle can carry solid additives such as polymers, latexes, UV curable materials, plasticizers, salts, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," refers to a solubility percentage of more than 0.1 wt %.

As used herein, "ink jetting" or "jetting" refers to compositions that are ejected from jetting architecture, such as ink-jet architecture. Ink-jet architecture can include thermal or piezo architecture. Additionally, such architecture can print varying drop sizes such as less than 10 picoliters, less than 20 picoliters, less than 30 picoliters, less than 40 picoliters, less than 50 picoliters, etc.

The term "thermoplastic polymer powder" refers to relatively fine thermoplastic particles with an average particle size from 20 μm to 100 μm. The thermoplastic polymer powder can have a melting or softening point from about 70° C. to about 350° C., and can include polymers such as nylons or polyamides, polyethylenes, thermoplastic polyurethanes, polypropylenes, polyesters, polycarbonates, polyether ketones, polyacrylates, polystyrenes, etc. The term "powder" can be used interchangeably with "particle" or "particulate."

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

A 3-dimensional printing system was used to print a 3-dimensional printed part having a photoluminescent composite layer on a surface of the part body. A photoluminescent ink and fusing ink were printed from two separate ink jet pens. Two separate photoluminescent inks were used. The first photoluminescent ink included 3 wt % fluorescein in an aqueous ink vehicle and the second photoluminescent ink included 0.25 wt % rhodamine B in an aqueous ink vehicle. The fusing ink included 5 wt % carbon black in an aqueous ink vehicle.

The inks were jetted onto a bed of nylon (PA12) particles (Vestosint®×1556). The nylon particles had an average particle size of approximately 50 μm. The layer thickness was approximately 100 μm. Each layer was printed with one of the two separate photoluminescent inks in pre-designated photoluminescent composite areas. The carbon black fusing ink was printed in both the photoluminescent composite areas and in other body portions. The inks were printed at contone levels of 255 for the photoluminescent inks and 80 for the fusing ink. A single pass of each of the inks was performed for the photoluminescent composite layer. After the single pass, a curing pass was performed.

The printer powder supply and powder bed were filled with the nylon particles. The supply temperature was set at 110° C. and the print bed temperature was set at 130° C. A heater under the print bed was set at 150° C. The print speed was set at 10 inches per second (ips) and the cure speed was set at 7 ips. Curing was performed using two 300 W bulbs placed approximately 1 cm away from the surface of the powder bed.

The 3-dimensional printed part included printed photoluminescent features that were relatively unobservable under ambient lighting. However, under UV light, the photoluminescent emission from the photoluminescent features became very prominent. The edges of the printed photoluminescent features were very clear, providing clearly distinguishable luminescent features under UV light. In particular, the photoluminescent features included circles, hexagons, and triangles.

Example 2

The same general printing parameters as described in Example 1 were used to print another 3-dimensional printed part having a photoluminescent composite layer on a surface of the part body. The 3-dimensional printed part was printed in predesignated areas with separate photoluminescent inks including 1.3 wt % Carboxy YG 100 nm nanospheres in an aqueous vehicle, 2.6 wt % Carboxy YG 100 nm nanospheres in an aqueous vehicle, 2.5 wt % Carboxy YO 400 nm nanospheres in an aqueous vehicle, 2.7 wt % Carboxy NYO 200 nm nanospheres in an aqueous vehicle, 2.6 wt % Carboxy YG 200 nm nanospheres in an aqueous vehicle, 2.6 wt % Carboxy BB 100 nm nanospheres in an aqueous vehicle, and 1.0 wt % Carboxy EU 200 nm nanospheres in an aqueous vehicle, respectively, each available from Polysciences, Inc.

Some of the features printed with the different photoluminescent inks were marginally observable under ambient lighting. However, these features could likely be masked using a specific colorant in combination with a particular photoluminescent ink. Under UV light, the photoluminescent features were clearly visible, some with stronger photoluminescence than others. The 2.5 wt % Carboxy YO 400 nm nanosphere ink and the 1.0 wt % Carboxy EU 200 nm nanosphere ink both had relatively strong photoluminescence in comparison with the other photoluminescent inks under the specific wavelength of UV light used to photoexcite the various photoluminescent features.

Example 3

The same general printing parameters as described in Example 1 were used to print yet another 3-dimensional printed part having a photoluminescent composite layer on a surface of the part body. The 3-dimensional printed part was printed in predesignated areas with separate photoluminescent inks including 1 wt % InP/ZnS quantum dots (oleylamine ligand) in an aqueous vehicle (available from NN-Labs), 0.1 wt % InP/ZnS quantum dots (carboxylic acid ligand) in an aqueous vehicle (available from NN-Labs), and 1 wt % NanoDOT™ CIS-700 in an aqueous vehicle (available from Voxtel).

The features printed with the different photoluminescent inks were largely unobservable under ambient lighting. However, under UV light, the photoluminescent features were clearly visible, some with stronger photoluminescence than others. The 1 wt % NanoDOT™ CIS-700 had relatively strong photoluminescence in comparison with the other photoluminescent inks under the specific wavelength of UV light used to photoexcite the various photoluminescent features.

What is claimed is:

1. A photoluminescent material set, comprising:
   a thermoplastic polymer powder having an average particle size from 20 μm to 100 μm;
   a photoluminescent ink comprising a photoluminescent agent, wherein the photoluminescent agent photoexcites within an ultraviolet (UV) range, but not within a visible range, and photoluminesces within the visible range; and
   a fusing ink comprising a fusing agent capable of absorbing electromagnetic radiation to produce heat.

2. The photoluminescent material set of claim 1, wherein the thermoplastic polymer powder is a nylon, a thermoplastic elastomer, a urethane, a polycarbonate, a polystyrene, or a combination thereof.

3. The photoluminescent material set of claim 1, wherein the photoluminescent agent comprises a photoluminescent pigment, a photoluminescent dye, a quantum dot, a photoluminescent nanoparticle, a photoluminescent microparticle, or a combination thereof.

4. The photoluminescent material set of claim 3, wherein photoluminescent agent is the quantum dot which has a particle size of from 2 nm to 10 nm.

5. The photoluminescent material set of claim 1, wherein the photoluminescent agent is present in the photoluminescent ink at from 0.01 wt % to 10 wt %.

6. The photoluminescent material set of claim 1, wherein the fusing agent comprises carbon black, a near-infrared absorbing dye, a near-infrared absorbing pigment, a tungsten bronze, a molybdenum bronze, metal nanoparticles, a conjugated polymer, or a combination thereof.

7. A 3-dimensional printing system, comprising:
a powder bed comprising a thermoplastic polymer powder having an average particle size from 20 μm to 100 μm;
an inkjet printer comprising:
a first inkjet pen in communication with a reservoir of a photoluminescent ink to print the photoluminescent ink onto the powder bed, wherein the photoluminescent ink comprises a photoluminescent agent that photoexcites within an ultraviolet (UV) range, but not within a visible range, and photoluminesces within the visible range, and
a second inkjet pen in communication with a reservoir of a fusing ink to print the fusing ink onto the powder bed, wherein the fusing ink comprises a fusing agent capable of absorbing electromagnetic radiation to produce heat; and
a fusing lamp to expose the powder bed to electromagnetic radiation sufficient to fuse thermoplastic polymer powder that has been printed with the photoluminescent ink, the fusing ink, or both.

8. The system of claim 7, wherein the thermoplastic polymer powder is a nylon, a thermoplastic elastomer, a urethane, a polycarbonate, a polystyrene, a combination thereof.

9. The system of claim 7, wherein the photoluminescent agent comprises a photoluminescent pigment, a photoluminescent dye, a quantum dot, a photoluminescent nanoparticle, a photoluminescent microparticle, or a combination thereof.

10. The system of claim 7, wherein the electromagnetic radiation is infrared or near-infrared radiation.

11. The system of claim 7, wherein the fusing agent comprises carbon black, a near-infrared absorbing dye, a near-infrared absorbing pigment, a tungsten bronze, a molybdenum bronze, metal nanoparticles, a conjugated polymer, or a combination thereof.

12. A 3-dimensional printed part, comprising:
a part body comprising multiple layers of fused thermoplastic polymer powder; and
a photoluminescent composite layer applied to a surface of the part body, the photoluminescent composite layer comprising a photoluminescent agent dispersed in a matrix of fused thermoplastic polymer powder, wherein the photoluminescent agent is present both beneath and at a surface of the photoluminescent composite layer, and wherein the photoluminescent agent photoexcites within an ultraviolet (UV) range, but not within a visible range, and photoluminesces within the visible range.

13. The 3-dimensional printed part of claim 12, wherein the photoluminescent composite layer has a thickness from 20 μm to 150 μm, and the photoluminescent agent extends into the photoluminescent composite layer to a depth of greater than 20% of the thickness.

14. The 3-dimensional printed part of claim 12, wherein the photoluminescent composite layer absorbs electromagnetic radiation at a wavelength less than 302 nm and photoluminesces at a wavelength from 302 nm to 700 nm.

15. The 3-dimensional printed part of claim 12, wherein the photoluminescent agent comprises a photoluminescent pigment, a photoluminescent dye, a quantum dot, a photoluminescent nanoparticle, a photoluminescent microparticle, or a combination thereof.

* * * * *